United States Patent
Chen et al.

(10) Patent No.: US 9,104,032 B1
(45) Date of Patent: Aug. 11, 2015

(54) NAKED-EYE 3D DISPLAY DEVICE AND LIQUID CRYSTAL LENS THEREOF

(71) Applicant: Shenzhen China Star Optoelectronics Technology Co., Ltd., Shenzhen (CN)

(72) Inventors: Chih-Wen Chen, Shenzhen (CN); Chia-Chiang Hsiao, Chenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/703,376

(22) PCT Filed: Nov. 16, 2012

(86) PCT No.: PCT/CN2012/084736
§ 371 (c)(1),
(2) Date: Dec. 11, 2012

(87) PCT Pub. No.: WO2014/075290
PCT Pub. Date: May 22, 2014

(30) Foreign Application Priority Data

Nov. 15, 2012 (CN) .......................... 2012 1 0460260

(51) Int. Cl.
*G02F 1/1335* (2006.01)
*G02B 27/22* (2006.01)
*G02F 1/1343* (2006.01)
*G02F 1/1337* (2006.01)

(52) U.S. Cl.
CPC .............. *G02B 27/22* (2013.01); *G02F 1/1337* (2013.01); *G02F 1/13439* (2013.01); *G02F 1/134309* (2013.01)

(58) Field of Classification Search
CPC ................... G02F 1/133526; G02F 1/133621; G02F 1/133512; G02B 27/26; G02B 27/2214; H04N 13/0404
USPC ....................................... 349/15, 95
See application file for complete search history.

(56) References Cited

U.S. PATENT DOCUMENTS

| 2009/0015738 A1* | 1/2009 | Hong et al. ...................... 349/15 |
| 2012/0162194 A1* | 6/2012 | Chen et al. ..................... 345/419 |
| 2013/0215373 A1* | 8/2013 | Naganuma et al. ........... 349/155 |

FOREIGN PATENT DOCUMENTS

| CN | 101344642 A | 1/2009 |
| CN | 102096200 A | 6/2011 |
| JP | 2006313248 A | 11/2006 |
| KR | 20080104715 A | 12/2008 |
| KR | 20090004006 A | 1/2009 |

\* cited by examiner

*Primary Examiner* — Mike Qi
(74) *Attorney, Agent, or Firm* — Mark M Friedman

(57) ABSTRACT

A naked-eye 3D display device has a display panel and a liquid crystal lens. The liquid crystal lens is mounted on the display panel and correspondingly overlapped with a pixel array of the display panel and has a first electrode, a second electrode and a liquid crystal layer between the first and the second electrodes. The second electrode has separated electrode units. Each electrode unit is in a strip shape and extends obliquely in a stair-shaped manner along a vertical direction in which pixels are arranged. The adjacent two of the electrode units receive different electric voltages to form a specific electric field with the first electrode to change an arrangement direction of liquid crystal molecules at a corresponding position in the liquid crystal layer. The structure of the liquid crystal lens effectively improves image crosstalk between left-eye and right-eye images.

13 Claims, 4 Drawing Sheets

NAKED-EYE 3D DISPLAY DEVICE AND LIQUID CRYSTAL LENS THEREOF

BACKGROUND OF THE INVENTION

1. Field of the Invention

The present invention relates to a liquid crystal display technology, especially to a naked-eye 3D display device and a liquid crystal lens thereof that improve crosstalk problems during displaying 3D images.

2. Description of the Related Art

In order to satisfy visual experiences, image display technologies have been developed from 2D display to 3D display. Conventional 3D display technologies are mainly divided into glasses-type 3D display technology (stereoscopic display) and naked-eye 3D display technology (auto-stereoscopic display). The advantage of naked-eye 3D display technology is the convenience of glasses-free.

The present naked-eye display technology may be carried out by using a parallax barrier, lenticular lenses or a directional backlight.

With reference to FIG. 1, FIG. 1 is an operational schematic view of a conventional lenticular-lens 3D display device. The lenticular-lens 3D display device is to mount a lens layer 91 formed by a plurality of lenticular lenses 910 in front of a liquid crystal display panel 90 so that when left-eye images and right-eye images travel through the lenticular lenses 910, the left-eye images and right-eye images will travel into a user's left eye and right eye, respectively, by refraction of light so that the user can see three-dimensional images.

With further reference to FIG. 2, FIG. 2 is a structural schematic view of a pixel array and lenticular lenses of a conventional lenticular-lens 3D display device. In the design of a naked-eye 3D display device using lenticular lenses, the lenticular lenses 910 of the lens layer 91 must be mounted at a specific angle to pixel rows 900 of a liquid crystal display panel so as to keep balance of resolution. However, as shown in FIG. 3, a schematic view of an image of a pixel array when the user is watching through slant lenticular lenses at a certain viewing angle, it can be seen in the figure that a viewing range 800 in which one of the user's eyes may receive images not only falls on those pixel units that provide right-eye images R but also falls on some pixel units that provide left-eye images L, and thereby causing the right eye to receive left-eye images and leading to image crosstalk. Besides, 3D viewing angle in such design becomes more limited.

Therefore, it is necessary to provide a naked-eye 3D display device and a liquid crystal lens thereof to overcome the problems existing in the conventional technology.

SUMMARY OF THE INVENTION

In view of the shortcomings of the conventional technology, the main objective of the invention is to provide a naked-eye 3D display device and a liquid crystal lens thereof that may improve image crosstalk problem during 3D display.

In order to achieve the foregoing object of the present invention, the present invention provides a naked-eye 3D display device comprising:

a display panel having pixel array; and a liquid crystal lens being mounted on the display panel, being overlapped with the pixel array of the display panel and having a first electrode, a second electrode and a liquid crystal layer mounted between the first electrode and the second electrode; wherein the second electrode has a plurality of electrode units being separated from each other; each of the electrode units is in a strip shape and extends obliquely in a stair-shaped manner in a vertical arranging direction of pixel units of the pixel array; the adjacent two of the electrode units receive different electric voltages so as to form a specific electric field with the first electrode to further control an arrangement direction of liquid crystal molecules which are in a corresponding position in the liquid crystal layer.

In one embodiment of the present invention, each of the electrode units extends between the pixel units of the pixel array.

In one embodiment of the present invention, the first electrode is mounted on a first substrate; the second electrode is mounted on a second substrate; and the second substrate is mounted opposite to the first substrate.

In one embodiment of the present invention, the adjacent electrode units are insulatedly separated from each other by a distance of the length of at least one of the pixel units.

In one embodiment of the present invention, each of the pixel units extending obliquely in a stair-shaped manner has vertical portions and horizontal portions, wherein the adjacent two of the horizontal portions of each of the pixel units are at a distance of the length of at least one of the pixel units from each other.

In one embodiment of the present invention, each of the pixel units includes at least one sub-pixel.

In one embodiment of the present invention, each of the pixel units includes three sub-pixels.

The present invention further provide a liquid crystal lens that is used in a naked-eye 3D display device, wherein the liquid crystal lens is correspondingly overlapped with a pixel array of a display panel and comprises:

a first electrode;

a second electrode being mounted opposite to the first electrode and having a plurality of electrode units, wherein each of the electrode units is in a strip shape and extends obliquely in a stair-shaped manner in a vertical arranging direction of pixel units of the pixel array, and the adjacent two of the electrode units receive different electric voltages so as to form a specific electric field with the first electrode; and a liquid crystal layer being mounted between the first electrode and the second electrode, wherein an arrangement direction of liquid crystal molecules in the liquid crystal layer is controlled by the specific electric field formed by the electrode units at a position corresponding to the liquid crystal molecules and the first electrode.

In one embodiment of the present invention, each of the electrode units extends between the pixel units of the pixel array.

In one embodiment of the present invention, the first electrode is mounted on a first substrate; the second electrode is mounted on a second substrate; and the second substrate is mounted opposite to the first substrate.

In the above description, the liquid crystal lens replaces the lenticular lens structure in the conventional technology based on the principle that the arrangement of liquid crystal molecules can change the direction of light, by applying different electric voltages to the separated electrode units of the second electrode, the image of the display panel will be divided into a left-eye image and a right-eye image after passing through the liquid crystal layer of the liquid crystal lens, so that a user can receive an image with 3D effect. Furthermore, the second electrode that forms the liquid crystal lens extends obliquely in a stair-shaped manner, which is different from the traditional slant lenticular lenses, can effectively improve image crosstalk between left-eye and right-eye images.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
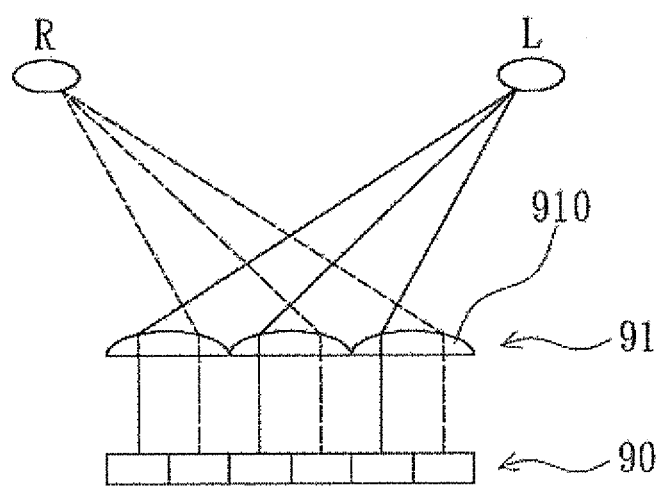
FIG. 1 is an operational schematic view of a conventional lenticular-lens 3D display device.
Figure 2:
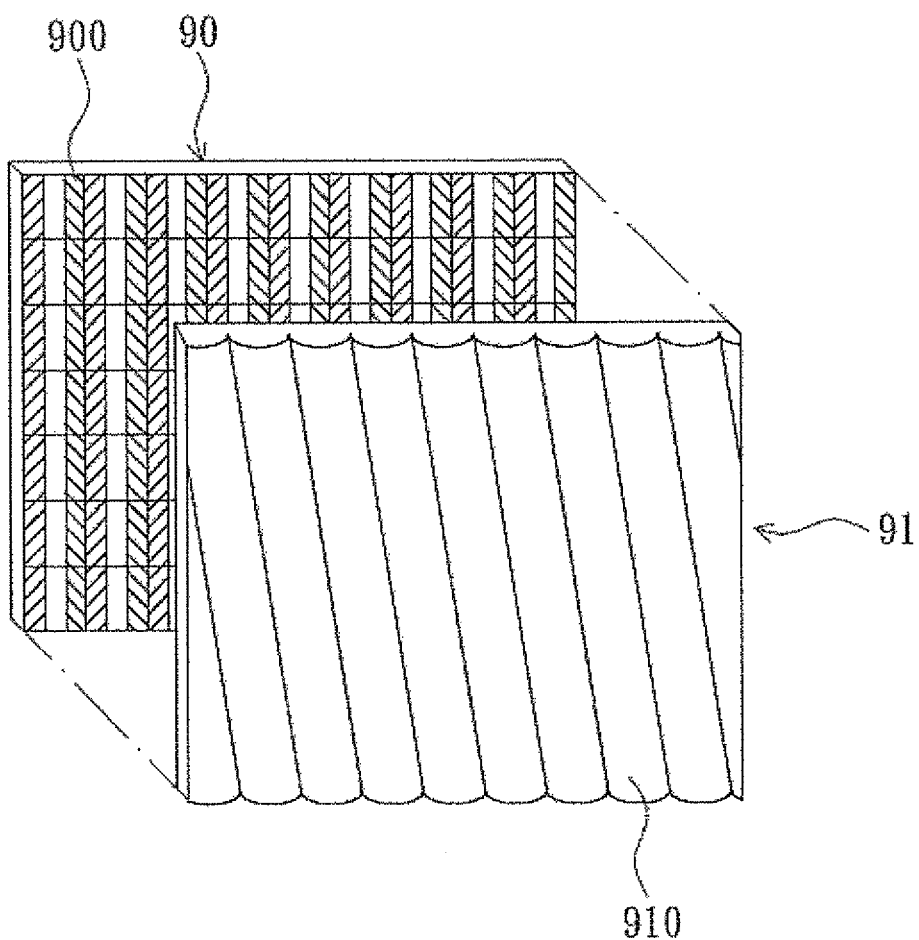
FIG. 2 is a structural schematic view of a pixel array and lenticular lenses of a conventional lenticular-lens 3D display device.
Figure 3:
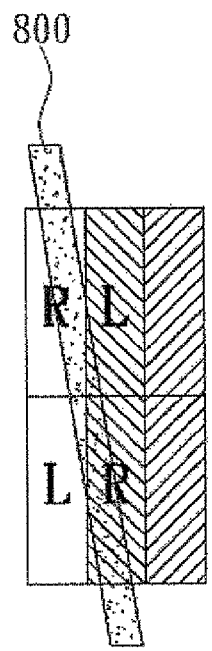
FIG. 3 is a schematic view of an image of a pixel array when a user is watching through slant lenticular lenses at a certain viewing angle.
Figure 4:
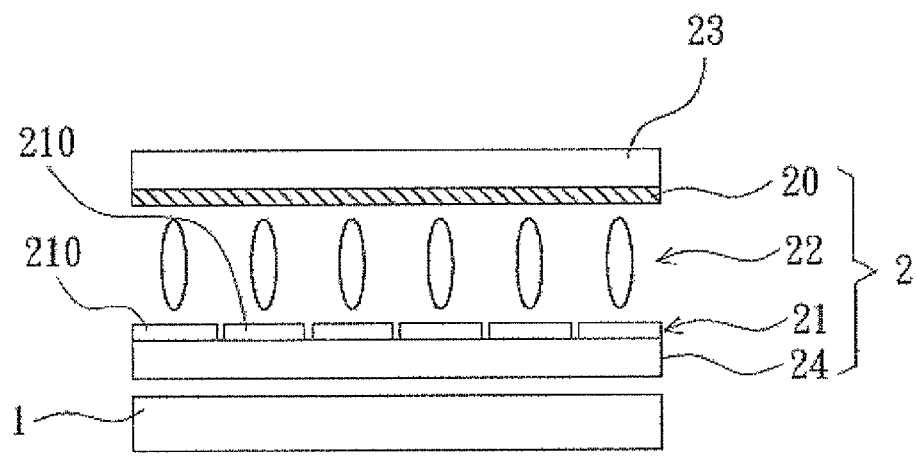
FIG. 4 is a structural schematic view of a naked-eye 3D display device according to a preferred embodiment of the present invention.

With reference to FIG. 4, FIG. 4 is a structural schematic view of a naked-eye 3D display device according to a preferred embodiment of the present invention. The naked-eye 3D display device of the present invention mainly comprises a display panel 1 and a liquid crystal lens 2. The display panel 1 is used to provide a two-dimensional image, and the liquid crystal lens 2 is used to convert the two-dimensional image into a three-dimensional image.

Figure 5:
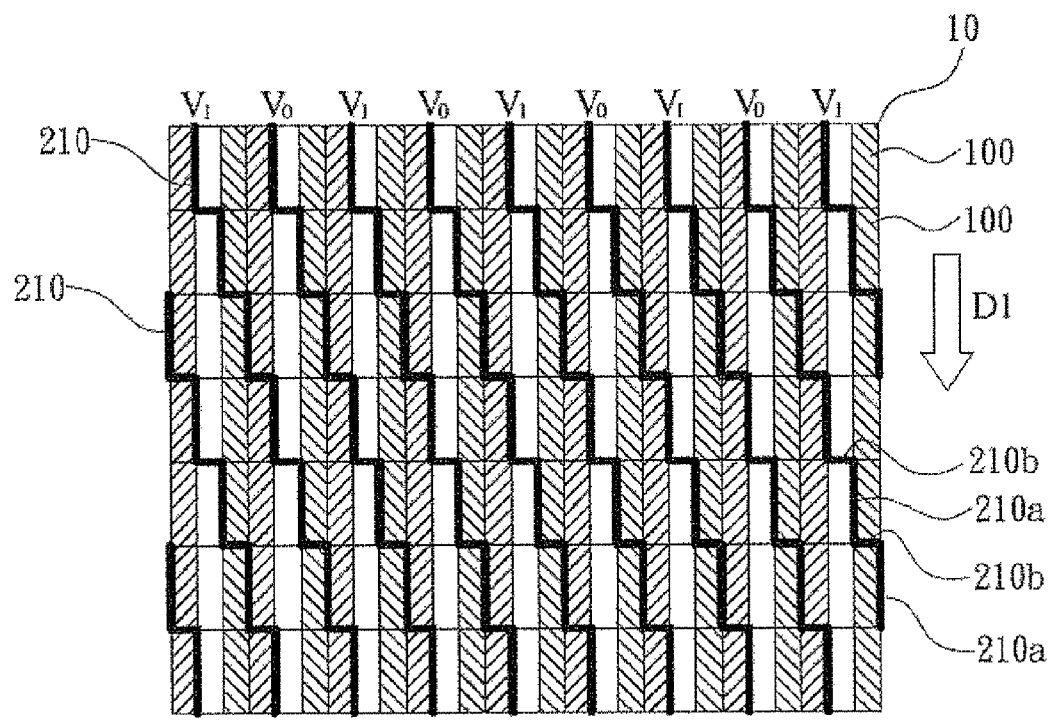
FIG. 5 is a schematic view of an arrangement of electrodes of a liquid crystal lens and a pixel array of the naked-eye 3D display device according to a preferred embodiment of the present invention.

With further reference to FIG. 5, the display panel 1 has a pixel array 10, and the pixel array 10 is configured by a plurality of regularly arranged pixel units 100. The display panel 1 may be a general liquid crystal display panel and has a color-filter substrate, a thin-film transistor substrate and a liquid crystal layer mounted between both of the substrates. The color-filter substrate has different colored photoresist units. The thin-film transistor substrate may include gate lines, data lines, switching elements and pixel electrodes. The gate lines and the data lines define a plurality of sub-pixel areas, and each of the switching elements and each of the pixel electrodes are mounted in each of the sub-pixel areas to correspond to each of the photo-resist units on the color-filter substrate so as to form the pixel array 10. The display panel 1 also has a backlight module to providing sufficient light sources for displaying images.

The liquid crystal lens 2 is mounted on the display panel 1 and is mounted on a light-exiting surface of the display panel 1 and is correspondingly overlapped with the pixel array 10. The liquid crystal lens 2 mainly comprises a first electrode 20, a second electrode 21 and a liquid crystal layer 22.

As shown in FIG. 4, the first electrode 20 is mounted on a first substrate 23, in general, the first electrode 20 may be a transparent electrical conductive film made of indium tin oxide and is used to receive a reference electric voltage.

As shown in FIG. 4, the second electrode 21 is mounted opposite to the first electrode 20 and is mounted on a second substrate 24. The second substrate 24 is mounted opposite to the first substrate 23. The second electrode 21 has a plurality of electrode units 210 being separated from each other, and can be formed by patterning a transparent electrical conductive film (such as indium tin oxide).

With reference to FIG. 5, each of the electrode units 210 is in a strip shape and extends obliquely in a stair-shaped manner along a vertical direction D1 in which the pixel units 100 of the pixel array 10 are arranged, wherein the adjacent two of the electrode units 210 receive different electric voltages so as to form a specific electric field with the first electrode 20. In this embodiment, each of the electrode units 210 extends between the pixel units 100 of the pixel array 10.

As shown in FIG. 4, the liquid crystal layer 22 is mounted between the first electrode 20 and the second electrode 21. An arrangement direction of liquid crystal molecules in the liquid crystal layer 22 is controlled by the specific electric field formed by the electrode units 210 to which the liquid crystal molecules correspond and the first electrode 20.

For example, as shown in FIG. 5, the odd-numbered ones of the electrode units 210 may receive an electric voltage V0, and the even-numbered ones of the electrode units 210 may receive another electric voltage V1, thus the electrode units 210 in adjacent positions can form different electric fields with the first electrode 20. At the moment, the liquid crystal molecules in the liquid crystal layer 22 will twist along with the corresponding electric field. When lights of two-dimensional images from the display panel 1 travel through the liquid crystal molecules, based on the principle of light refraction, lights of left-eye images and lights of right-eye images will be projected out with different angles and eventually reach the observer's both eyes, respectively. The observer then can see an image having a three-dimensional effect. Thus, the liquid crystal lens 2 can provide the same optical effect as traditional slant lenticular lenses do.

In this embodiment, each of the pixel units 100 includes at least one sub-pixel, for example, three sub-pixels. Besides, the adjacent electrode units 210 are insulatedly separated from each other by a distance of the length of at least one of the pixel units 100. Each of the pixel units 210 extending obliquely in the stair-shaped manner has vertical portions 210a and horizontal portions 210b, wherein the adjacent two of the horizontal portions 210b of each of the pixel units 210 are at a distance of the length of at least one of the pixel units 100 from each other.

Based on the principle that the arrangement of liquid crystal molecules can change the direction of lights, the naked-eye 3D display device of the present invention use the liquid crystal lens 2 to replace traditional slant lenticular lenses. The liquid crystal lens 2 controls the arrangement of liquid crystal by applying different electric voltages to the separated electrode units 210 of the second electrode 21, so that the two-dimensional image of the display panel 1 is divided into a left-eye image and a right-eye image after passing through the liquid crystal layer 22 of the liquid crystal lens 2, and then a user can receive an image with 3D effect.

Figure 6:
FIG. 6 is a schematic view of an image of a pixel array when a user is watching through the liquid crystal lens of the naked-eye 3D display device of the present invention at a certain viewing angle.

In the meantime, as shown in FIG. 6, besides providing the same function as the traditional slant lenticular lenses do, the electrode units 210 of the second electrode 21 of the liquid crystal lens 2 that have a structure that extends obliquely in a stair-shaped manner can accurately dividing left-eye images from right eye images. It can be seen in the figure that a viewing range 300 in which a user's right eye may receive images completely falls on those pixel units that provide right-eye images R, so that left-eye images that are provided from the next pixel units will not be received by the right eye to cause image crosstalk. Thus, different from the traditional technology using slant lenticular lenses, the naked-eye 3D display device of the present invention can effectively improve image crosstalk between left-eye and right-eye images.

By the above description, compared with the conventional 3D display technology having a problem of image crosstalk, the naked-eye 3D display device of the present invention uses a liquid crystal lens to achieve the object of converting two-dimensional images into three-dimensional images. Furthermore, the second electrode that forms the liquid crystal lens extends obliquely in a stair-shaped manner, which is different from the traditional slant lenticular lenses, can effectively improve image crosstalk between left-eye and right-eye images.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A naked-eye 3D display device comprising:
   a display panel having pixel array; and
   a liquid crystal lens being mounted on the display panel, being overlapped with the pixel array of the display panel and having a first electrode, a second electrode and a liquid crystal layer mounted between the first electrode and the second electrode; wherein the second electrode has a plurality of electrode units being separated from each other; each of the electrode units is in a strip shape and extends obliquely in a stair-shaped manner along a vertical direction in which pixel units of the pixel array are arranged; each of the electrode units extends between the pixel units of the pixel array; the adjacent electrode units are insulatedly separated from each other by a distance of the length of at least one of the pixel units; and the adjacent two of the electrode units receive different electric voltages so as to form a specific electric field with the first electrode to further control an arrangement direction of liquid crystal molecules which are in a corresponding position in the liquid crystal layer.

2. The naked-eye 3D display device as claimed in claim 1, wherein the first electrode is mounted on a first substrate; the second electrode is mounted on a second substrate; and the second substrate is mounted opposite to the first substrate.

3. The naked-eye 3D display device as claimed in claim 2, wherein each of the pixel units extending obliquely in a stair-shaped manner has vertical portions and horizontal portions, wherein the adjacent two of the horizontal portions of each of the pixel units are at a distance of the length of at least one of the pixel units from each other.

4. A naked-eye 3D display device comprising:
   a display panel having pixel array; and
   a liquid crystal lens being mounted on the display panel, being overlapped with the pixel array of the display panel and having a first electrode, a second electrode and a liquid crystal layer mounted between the first electrode and the second electrode; wherein the second electrode has a plurality of electrode units being separated from each other; each of the electrode units is in a strip shape and extends obliquely in a stair-shaped manner along a vertical direction in which pixel units of the pixel array are arranged; the adjacent two of the electrode units receive different electric voltages so as to form a specific electric field with the first electrode to further control an arrangement direction of liquid crystal molecules which are in a corresponding position in the liquid crystal layer.

5. The naked-eye 3D display device as claimed in claim 4, wherein each of the electrode units extends between the pixel units of the pixel array.

6. The naked-eye 3D display device as claimed in claim 4, wherein the first electrode is mounted on a first substrate; the second electrode is mounted on a second substrate; and the second substrate is mounted opposite to the first substrate.

7. The naked-eye 3D display device as claimed in claim 4, wherein the adjacent electrode units are insulatedly separated from each other by a distance of the length of at least one of the pixel units.

8. The naked-eye 3D display device as claimed in claim 4, wherein each of the pixel units extending obliquely in a stair-shaped manner has vertical portions and horizontal portions, wherein the adjacent two of the horizontal portions of each of the pixel units are at a distance of the length of at least one of the pixel units from each other.

9. The naked-eye 3D display device as claimed in claim 8, wherein each of the pixel units includes at least one sub-pixel.

10. The naked-eye 3D display device as claimed in claim 9, wherein each of the pixel units includes three sub-pixels.

11. A liquid crystal lens being used in a naked-eye 3D display device, wherein the liquid crystal lens is correspondingly overlapped with a pixel array of a display panel, and comprises:
    a first electrode;
    a second electrode being mounted opposite to the first electrode and having a plurality of electrode units being separated from each other, wherein each of the electrode units is in a strip shape and extends obliquely in a stair-shaped manner along a vertical direction in which pixel units of the pixel array are arranged, and the adjacent two of the electrode units receive different electric voltages so as to form a specific electric field with the first electrode; and
    a liquid crystal layer being mounted between the first electrode and the second electrode, wherein an arrangement direction of liquid crystal molecules in the liquid crystal layer is controlled by the specific electric field formed by the electrode units at a position corresponding to the liquid crystal molecules and the first electrode.

12. The liquid crystal lens being used in a naked-eye 3D display device as claimed in claim 11, wherein each of the electrode units extends between the pixel units of the pixel array.

13. The liquid crystal lens being used in a naked-eye 3D display device as claimed in claim 12, wherein the first electrode is mounted on a first substrate; the second electrode is mounted on a second substrate; and the second substrate is mounted opposite to the first substrate.

* * * * *

UNITED STATES PATENT AND TRADEMARK OFFICE
CERTIFICATE OF CORRECTION

| | | |
|---|---|---|
| PATENT NO. | : 9,104,032 B1 | Page 1 of 1 |
| APPLICATION NO. | : 13/703376 | |
| DATED | : August 11, 2015 | |
| INVENTOR(S) | : Chen et al. | |

It is certified that error appears in the above-identified patent and that said Letters Patent is hereby corrected as shown below:

On the title page item (72)

change

-- Chia-Chiang Hsiao, Chenzhen (CN) -- to

"Chia-Chiang Hsiao, Shenzhen (CN)"

Signed and Sealed this
Fifteenth Day of March, 2016

Michelle K. Lee
*Director of the United States Patent and Trademark Office*